United States Patent [19]

Bruhn

[11] Patent Number: 5,063,317

[45] Date of Patent: Nov. 5, 1991

[54] ELECTRIC MOTOR, ESPECIALLY AN ELECTRIC SMALL-POWER MOTOR FOR DRIVING WIPER SYSTEMS OF MOTOR VEHICLES

[75] Inventor: Rainer Bruhn, Karlsruhe, Fed. Rep. of Germany

[73] Assignee: SWF Auto-Electric GmbH, Bietigheim-Bissingen, Fed. Rep. of Germany

[21] Appl. No.: 427,052

[22] Filed: Oct. 25, 1989

[30] Foreign Application Priority Data

Nov. 11, 1988 [DE] Fed. Rep. of Germany ....... 3838285

[51] Int. Cl.[5] ............................................. H02K 5/00
[52] U.S. Cl. ........................................ 310/91; 310/42; 310/68 R; 310/71; 310/83; 310/89
[58] Field of Search ................... 310/42, 157, 89, 91, 310/43, 68 R, 83, 112, 71, 88; 248/313, 316.7

[56] References Cited

U.S. PATENT DOCUMENTS

| | | | |
|---|---|---|---|
| 4,398,135 | 8/1983 | Busch et al. | 310/71 |
| 4,553,445 | 11/1985 | Mazzorana | 310/89 |
| 4,572,979 | 2/1986 | Haar et al. | 310/68 R |
| 4,614,886 | 9/1986 | Schneider et al. | 310/89 |
| 4,929,857 | 5/1990 | Isozumi | 310/83 |
| 4,963,778 | 10/1990 | Jensen | 310/89 |

FOREIGN PATENT DOCUMENTS

| | | | |
|---|---|---|---|
| 2260081 | 6/1974 | Fed. Rep. of Germany | 310/89 |
| 2334913 | 1/1975 | Fed. Rep. of Germany | 248/316.7 |
| 2068649 | 8/1981 | United Kingdom | 310/89 |

*Primary Examiner*—R. Skudy
*Attorney, Agent, or Firm*—Robert P. Seitter; J. Gordon Lewis

[57] ABSTRACT

An electric motor, especially an electric, small-power motor for driving wiper systems of motor vehicles, in which an electronics housing (50) is arranged beside a motor housing (10) by affixing the electronics housing to a central bulge (13) on the bottom (12) of the motor housing (10).

15 Claims, 4 Drawing Sheets

ELECTRIC MOTOR, ESPECIALLY AN ELECTRIC SMALL-POWER MOTOR FOR DRIVING WIPER SYSTEMS OF MOTOR VEHICLES

BACKGROUND OF THE INVENTION

The present invention relates to an electric motor used to drive wiper systems of motor vehicles.

An electric motor of this type is disclosed in U.S. Pat. No. 4,398,135 entitled "Windshield Wiper Electric Drive Unit", especially in FIG. 13. In this electric motor, the electronics housing of the electric motor contains elements of electronic control. The electronics housing, which is elongated, is located beside the cylindrical motor housing and extends from a gear housing flanged to the motor housing at the upper end of the motor housing downward to the bottom of the motor housing. At its lower end, the electronics housing has plugs which extend in the axial direction of the motor housing. These plugs are surrounded by a protective collar which simultaneously serves to hold the housing of receptacles which engage these plugs. At its opposite end, the electronics housing mates with plugs located in a plug housing situated on the surface of the gear housing. Furthermore, the electronics housing is supported on the surface of the motor housing by a web.

SUMMARY OF THE INVENTION

The object of the present invention is to improve the way the electronics housing is fixed to the electric motor by simplifying the means of attachment.

This object is achieved, according to the present invention, by supporting the electronics housing on a central bulge on the bottom of the motor housing. In contrast to supporting the electronics housing on the surface of the motor housing, this configuration will support even a very long electronics housing at the point where forces are exerted when the plugs and receptacles are engaged or disengaged. Thus, the danger that the electronics housing may detach from the motor housing, when the electric motor is manipulated, is reduced.

More particularly, in the preferred embodiment of the present invention, the electronics housing is secured on the bulge of the motor housing against movement in all directions perpendicular to the axis of the surface area of the motor housing. For this purpose, an eye surrounding the bulge for more than 180° is integrally formed onto the electronics housing. It is possible to form the eye as a closed ring which is placed over the bulge during assembly. In this case, however, it might be necessary during the assembly first to move the electronics housing towards the bulge and then to rotate the electronics housing, by means of the eye, around the axis of the motor housing in order to connect the electronics housing with the electric motor at further fixing points. In order to avoid this, the eye may be formed in the shape of a cramp which can be snap-fitted onto the bulge in a direction perpendicular to the axis of the surface area of the motor housing. Thus, in the preferred embodiment, the eye can be snap-fitted onto the bulge by moving the electronics housing tangentially with respect to the axis surface area of the motor housing.

Usually, electric, small-power motors used to drive automotive wiper systems have a gear housing flanged to the motor housing. According to another aspect of the present invention, the electronics housing is also fixed to the top of the gear housing. When a tongue of the top of the gear housing extends edge of the gear housing downward below the top of the motor housing, the tongue is beside the motor housing and the electronics housing may be fixed to the tongue.

To fix the electronics housing onto the tongue, one or more tappets may be used. Each tappet penetrates a bore in the tongue and is plastically deformed once it has passed through the bore. In addition, one or more locking elements, formed on the electronics housing and passing outside the tongue, engage behind the tongue.

In order to connect the electric motor and the electronics housing electrically, a plastic member preferably is positioned on the tongue of the top extending the edge of the gear housing. Several plugs, held inside the plastic member, mate with receptacles in the electronics housing. The plastic member may be injection-molded directly onto the top, whereby the plugs also may be embedded into the plastic material. To assure proper contact between the plugs and receptacles and to facilitate assembly of the electronics housing, the plugs protrude in a direction at least approximately perpendicular to the top.

The electronics housing can also be secured on the top by means of a resilient locking hook which is formed in the plastic member and extends at least approximately perpendicularly to the top, penetrates an aperture in the electronics housing, and engages behind a wall of the electronics housing. To assure a tight connection, a sealing element is provided between the plastic member and the electronics housing. This sealing element surrounds both the openings penetrated by the plugs and the aperture in the electronics housing penetrated by the locking hook.

A step may be formed in the outer wall of the electronics housing so that the side edge of the gear housing fits securely on the step. Thus, tight construction is achieved. To assure that fluid collected in the electronics housing can flow out, however, the step may be formed over only part of the width of the electronics housing and a groove, which leads to a hole, placed in the electronics housing in front of the step.

Further details and advantages of an electric motor constructed in accordance with the present invention will become evident from the following description of two embodiments, which will be explained more fully by reference to the accompanying drawings.

DETAILED DESCRIPTION OF THE INVENTION

Figure 1:
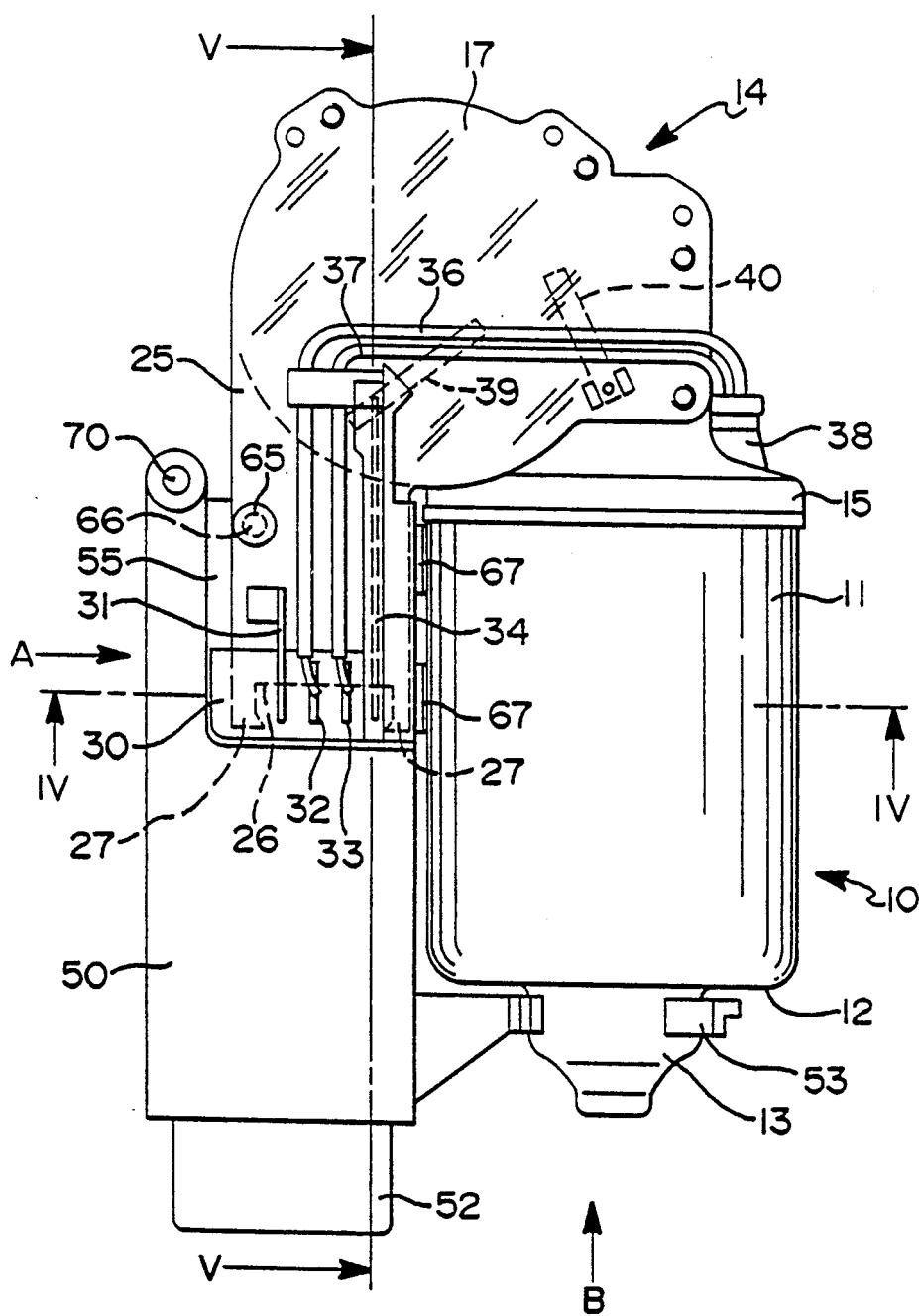
FIG. 1 illustrates schematically an electric motor of the present invention.
Figure 2:
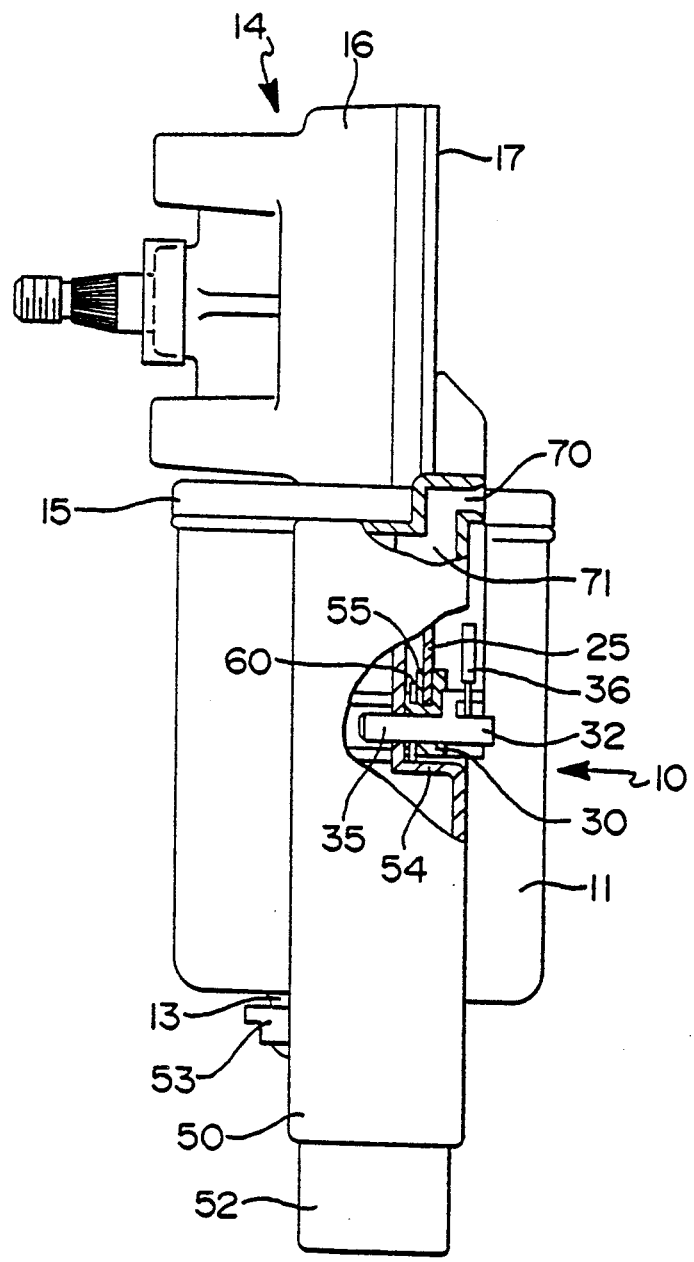
FIG. 2 is a view of the electric motor according to the present invention in the direction of Arrow A of FIG. 1, including two partial sections.
Figure 3:
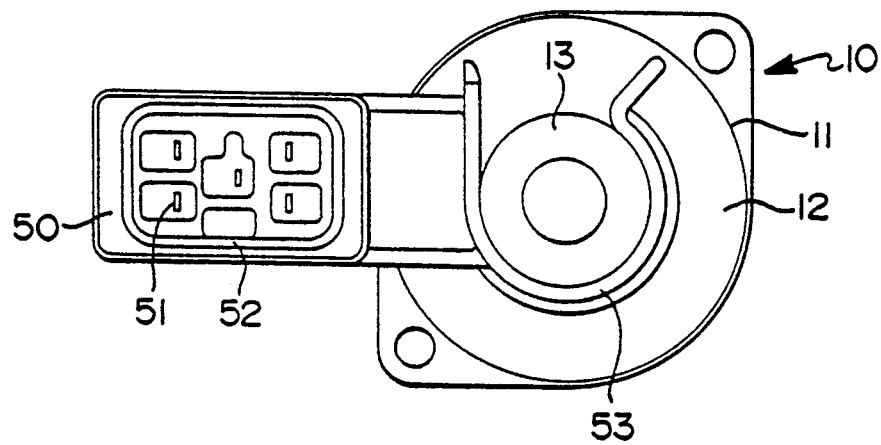
FIG. 3 is a view in the direction of Arrow B of FIG. 1.
Figure 4:
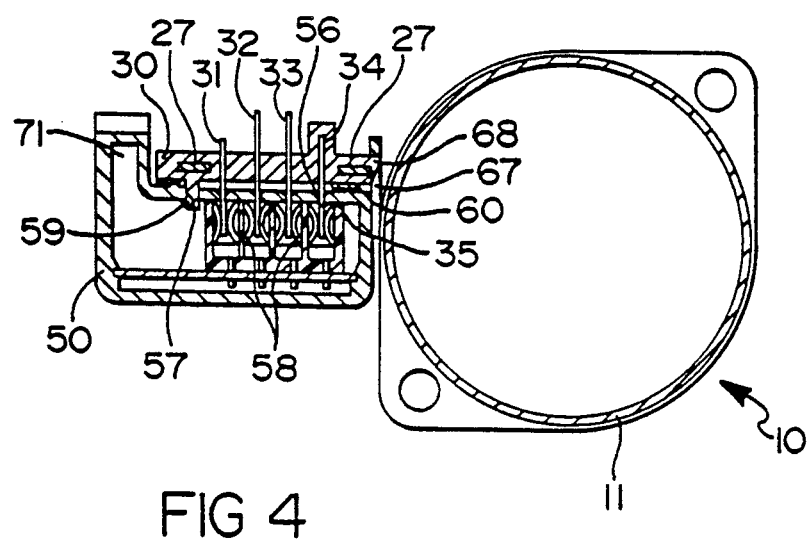
FIG. 4 is a section taken along the line IV—IV of FIG. 1, in which the parts in the motor housing are omitted.
Figure 5:
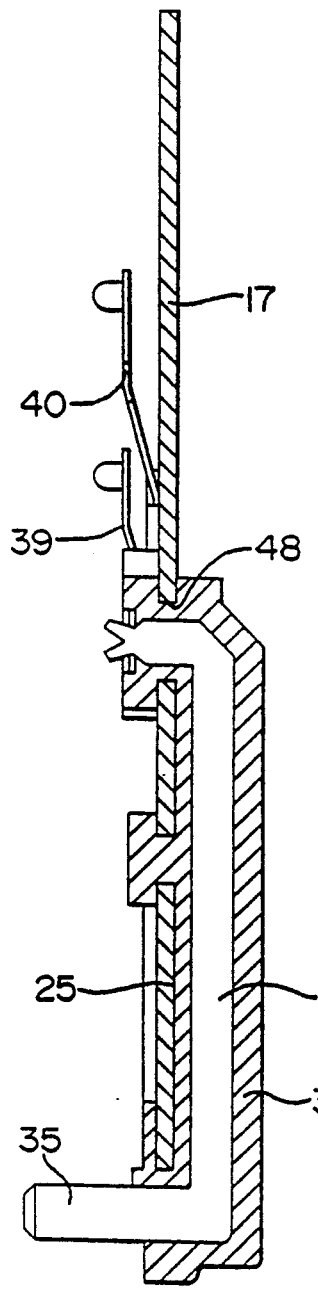
FIG. 5 is an enlarged sectional view of the top of the gear housing taken along the line V—V of FIG. 1.

The electric motor of the present invention has a motor housing 10, the cylindrical surface area 11 and the bottom 12 of which are integrally deep-drawn from a metal sheet. The motor housing 10 is provided with two permanent magnets (not shown) and a rotatable armature (not shown) in a known manner and, therefore, not illustrated. Extending from the bottom 12 of the motor housing 10 is a central bulge 13 which contains a bearing for the armature of the motor in a known manner.

Opposite the bottom 12, a gear housing 14 with an end shield 15 is flanged onto the motor housing 10. The gearing pot 16 of the gear housing 14 receives the gearing and has an axis that is perpendicular to the axis of the motor housing 10 and extends the circumference of the motor housing 10 in a direction perpendicular to this axis. The gearing pot 16 is closed by a top 17 on the gear housing 14. Top 17 is punched out of flat metal sheet.

A tongue 25 of the top 17 of gear housing 14 vertically extends beside the motor housing 10 toward the bottom 12 of housing 10, projecting beyond the gearing pot 16. The lower end of the tongue 25 is approximately at the midpoint of the surface area 11 of the motor housing 10. In the center of the lower end of the tongue 25, a recess 26 is cut out so that there are two tabs 27 projecting in the longitudinal direction of tongue 25 which on one side are in alignment with the lateral edges of the tongue 25. A plastic member 30 is injection-molded on the end of the tongue 25. Plastic member 30 is stabilized by the tabs 27 of the tongue 25 and is secured on the tongue 25 by undercuts at the edges of the tabs 27 facing the recess 26. Within the recess 26 of the tongue 25, four metal sheets 31 to 34 punched out of a flat material are embedded into the plastic member 30. Metal sheets 31 to 34 are arranged in a row at the side of the top 17 facing the gearing pot 16 and protrude as blade terminals perpendicular to the top 17. Visible in FIG. 1, there is a section of the metal sheet 31 by which the metal sheet is welded onto the top 17. Two cables 36 and 37 are soldered onto the metal sheets 32 and 33. Cables 36 and 37 are inserted through a bushing 38 into the motor housing 10. The metal sheet 34, surrounded by plastic, extends parallel the tongue up to the gearing pot 16, turns off, and passes through a recess 48 in the top 17 into the interior of the gearing pot. At that point, a first brush spring 39 is fixed onto the metal sheet 34. Brush spring 39 and a second brush spring 40, riveted onto the top 17, are part of a parking-position switch of the electric motor.

Figure 6:
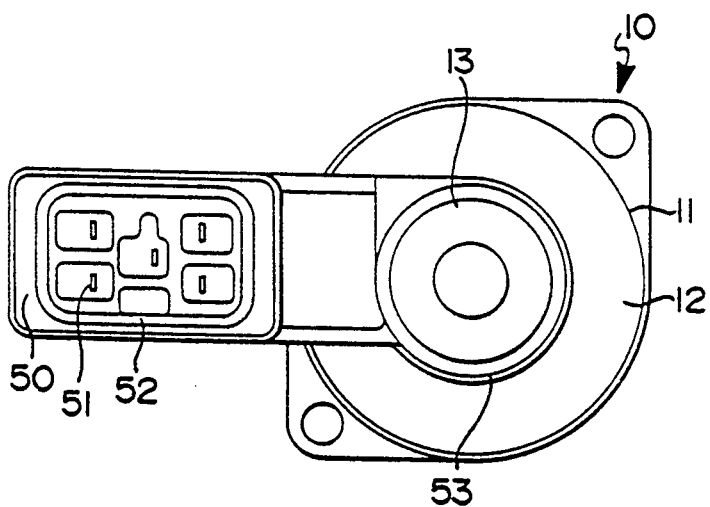
FIG. 6 is a view corresponding to that of FIG. 3 of a second embodiment with a closed fastening eye.

An electronics housing 50, arranged beside the motor housing 10, is fixed to the electric motor and extends from the end shield 15 beyond the bottom 12 of the motor housing 10. At the end of the electronics housing 50 near the bottom 12, plugs 51 extend the electronics housing 50 in the axial direction of the motor housing. Plugs 51 are surrounded by a collar 52 which fastens a housing of mating receptacles (not shown). At a level below the bottom 12 of motor housing 10, an eye 53 is formed on the electronics housing 50. Eye 53 is formed in the shape of a cramp in the embodiment according to the FIGS. 1 to 5 and embraces the bulge 13 sufficiently to secure electronics housing 50 onto the bulge 13 against movement in all directions perpendicular to the axis of the motor housing 10. Eye 53 can be snap-fitted onto the bulge 13 in a lateral direction perpendicular to the axis of the motor housing 10. It is also possible, however, to place eye 53 vertically onto the bulge 13. In that case eye 53 can be closed, as it is made clear in the embodiment shown in FIG. 6.

The electronics housing 50 lies primarily adjacent the top 17 of the gear housing 14 and, more precisely, at the side of the tongue 25 of the top 17 and facing the gearing pot 16. A space 55 is formed on the outside surface of the electronics housing 50, in which the tongue 25 and the plastic member 30 are situated, by means of a step 54. Immediately in front of the step 54, there are positioned several apertures 56 and 57 in the electronics housing 50. Female contacts 58 behind the apertures 56 in the electronics housing 50 accept the blade terminals 35 of the metal sheets 31 to 34 upon insertion. A locking hook 59 formed on the plastic member 30 penetrates the opening 57 in electronics housing 50 and engages behind a wall of the electronics housing 50. The apertures 56 and opening 57 are surrounded by a sealing element 60 pinched between the electronics housing 50 and the plastic member 30.

To further fix the electronics housing 50 onto the tongue 25 of the top 17, a tappet 65 is formed onto the electronics housing 50. Tappet 65 penetrates a bore 66 in the tongue 25 and is plastically deformed once having passed through bore 66 of the tongue 25.

In addition, two locking eyelets 67 are formed in the electronics housing 50 on the side facing the motor housing 10. Each eyelet 67 engages behind a locking lug 68 on the plastic member 30. Locking lugs extend laterally the tongue 25.

The locking hook 59 and the one of the two locking eyelets 67 are positioned immediately next to the sealing element 60. Thus, the sealing force required to press the sealing element 60 tightly on the plastic member 30 and on the electronics housing 50 is ensured.

Despite all precautions, the electronics housing 50 may fill with water. Therefore, at the point of the electronics housing 50 which is the lowest after the electric motor is assembled in a motor vehicle, an outlet drain 70 is provided to remove water. To prevent the water from remaining in the electronics housing 50, the step 54 and, thus, the space 55 do not extend over the entire width of the electronics housing 50. Instead, a groove 71 extends beside the space 55 and ends in the outlet drain 70.

The different means for fastening the electronics housing 50 to the electric motor—for instance, the eye 53, the tappet 65, the locking eyelets 67, and the locking hook 59—as well as the blade terminals 35 and female contacts 58 are arranged in such a way that the electronics housing 50 can be fixed perpendicularly to the top 17 of the gear housing 14 and, thus, tangentially to the motor housing 10. The relatively large distances between the positions of the blade terminals 35, female contacts 58, tappet 65, locking hook 59, and locking eyelets 67 from the axis of the motor housing 10 makes it possible to place the eye 53 onto the bulge 13 of the bottom 12 first, by moving the electronics housing 50 in the direction of the axis of the motor housing 10 and then engaging the electrical contacts and the fastening means by rotating the electronics housing 50 around the axis of the motor housing 10.

What is claimed is:

1. An electric motor for driving wiper systems of motor vehicles comprising:
   a substantially cylindrical motor housing having a longitudinal axis and a bottom with a bulge extending outward from said bottom of said motor housing and aligned with said axis of said motor housing;

an electronics housing positioned beside said motor housing;

and means extending between said electronics housing and said bulge including an eye for attaching said electronics housing to said motor housing.

2. An electric motor according to claim 1 wherein said attaching means secure said electronics housing to said motor housing against movement between said electronics housing and said motor housing in all directions perpendicular to said axis of said motor housing.

3. An electric motor according to claim 2 wherein said eye of said attaching means is formed integrally with said electronics housing and surrounds said bulge along an arc greater than 180°.

4. An electric motor according to claim 3 wherein said eye completely surrounds said bulge.

5. An electric motor according to claim 3 wherein said eye is an open cramp, snap-fitted on said bulge.

6. An electric motor according to claim 1 further including:
(a) a gear housing,
(b) means for attaching said gear housing to a second end of said motor housing, and
(c) means for attaching said electronics housing to said gear housing.

7. An electric motor according to claim 6 wherein said gear housing is disposed substantially perpendicular to said axis of said motor housing.

8. An electric motor according to claim 7 further including a tongue on said gear housing extending alongside said motor housing and said electronics housing is attached to said tongue.

9. An electric motor according to claim 8 wherein said means for attaching said electronics housing to said gear housing include a locking element formed on said electronics housing and engaging said tongue.

10. An electric motor for driving wiper systems of motor vehicles comprising:
a substantially cylindrical motor housing having a longitudinal axis and a bottom with a bulge extending outward from said bottom of said motor housing and aligned with said axis of said motor housing;
an electronics housing positioned beside said motor housing;
means extending between said electronics housing and said bulge for attaching said electronics housing to said motor housing;
a gear housing disposed substantially perpendicular to said axis of said motor housing;
a tongue on said gear housing extending alongside said motor housing and attached to said electronics housing;
a plastic member carried on said tongue;
a plurality of plugs carried by said plastic member;
a plurality of receptacles carried by said electronics housing which receive said plurality of plugs;
means for attaching said gear housing to a second end of said motor housing; and
means for attaching said electronics housing to said gear housing.

11. An electric motor according to claim 10 wherein said plugs extend substantially parallel to said axis of said motor housing.

12. An electric motor according to claim 11 wherein said tongue has two tabs which extend into said plastic member and said plugs are located between said tabs.

13. An electric motor for driving wiper systems of motor vehicles comprising:
a substantially cylindrical motor housing having a longitudinal axis and a bottom with a bulge extending outward from said bottom of said motor housing and aligned with said axis of said motor housing;
an electronics housing positioned beside said motor housing and having a step formed in its surface defining a space;
means extending between said electronics housing and said bulge for attaching said electronics housing to said motor housing;
a gear housing disposed substantially perpendicular to said axis of said motor housing;
a tongue on said gear housing extending alongside said motor housing and positioned in said space in said electronics housing;
means for attaching said gear housing to a second end of said motor housing, and
means for attaching said electronics housing to said gear housing.

14. An electric motor according to claim 13 wherein:
(a) said step extends over a selected width of said electronics housing,
(b) said electronics housing has an outlet drain, and
(c) said electronics housing has a groove adjacent said space defined by said step leading to said outlet drain.

15. An electric motor for driving wiper systems of motor vehicles comprising:
a substantially cylindrical motor housing having a longitudinal axis and a bottom with a bulge extending outward from said bottom of said motor housing and aligned with said axis of said motor housing;
an electronics housing positioned beside said motor housing; and
means extending between said electronics housing and said bulge for attaching said electronics housing to said motor housing, said attaching means securing said electronics housing to said motor housing against movement between said electronics housing and said motor housing in all directions perpendicular to said axis and including an open cramp formed integrally with said electronics housing and adapted to surround said bulge along an arc greater than 180° when said cramp is snap-fitted on said bulge.

* * * * *